United States Patent
Lee

(10) Patent No.: US 11,648,921 B2
(45) Date of Patent: May 16, 2023

(54) ADVANCE DRIVER BRAKE CUSTOMIZING METHOD AND SYSTEM THEREOF

(71) Applicants: Hyundai Motor Company, Seoul (KR); Kia Motors Corporation, Seoul (KR)

(72) Inventor: Soo-Hyuk Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 701 days.

(21) Appl. No.: 16/687,083

(22) Filed: Nov. 18, 2019

(65) Prior Publication Data
US 2020/0262402 A1 Aug. 20, 2020

(30) Foreign Application Priority Data
Feb. 18, 2019 (KR) .................. 10-2019-0018389

(51) Int. Cl.
*B60T 8/40* (2006.01)
*B60T 8/17* (2006.01)
*H04W 4/46* (2018.01)
*H04W 76/10* (2018.01)

(52) U.S. Cl.
CPC ............ *B60T 8/4081* (2013.01); *B60T 8/17* (2013.01); *H04W 4/46* (2018.02); *H04W 76/10* (2018.02); *B60T 2220/04* (2013.01); *B60T 2240/00* (2013.01); *B60T 2250/00* (2013.01); *B60T 2250/02* (2013.01)

(58) Field of Classification Search
CPC ...... B60T 8/4081; B60T 8/17; B60T 2204/00; B60T 2250/00; B60T 2250/02; H04W 4/46; H04W 76/10

USPC .......................................................... 701/70
See application file for complete search history.

(56) References Cited

U.S. PATENT DOCUMENTS

| 9,308,879 | B2 | 4/2016 | Wright et al. |
|---|---|---|---|
| 10,589,738 | B1* | 3/2020 | Boecker ................ B60W 10/18 |
| 2005/0057098 | A1* | 3/2005 | Bouchon ................ B60L 50/61 |
| | | | 180/65.245 |
| 2010/0036560 | A1* | 2/2010 | Wright .................. B60R 16/037 |
| | | | 701/36 |
| 2019/0232974 | A1* | 8/2019 | Reiley .................. G06V 20/597 |

(Continued)

FOREIGN PATENT DOCUMENTS

| JP | 2010-036899 A | 2/2010 |
|---|---|---|
| JP | 2016-124405 A | 7/2016 |
| KR | 20140133214 A | 11/2014 |

*Primary Examiner* — Yazan A Soofi
(74) *Attorney, Agent, or Firm* — Fox Rothschild LLP

(57) ABSTRACT

An advance driver brake customizing method applied to a brake customizing system is provided to identically implement a braking feeling set according to a driver's vehicle regardless of a vehicle type by transplanting driver braking feeling information of a driver's vehicle into a braking feeling matching vehicle. A braking characteristic of a brake of a brake system, which is applied to the braking feeling matching vehicle, is directed to follow the braking characteristic of a brake of the brake system, which is applied to the braking feeling matching vehicle, through driver matching control in conjunction with a wireless network. In particular, even when the same driver changes a vehicle or a driver for the same vehicle is changed, the same braking feeling is maintained.

16 Claims, 4 Drawing Sheets

(56) References Cited

U.S. PATENT DOCUMENTS

2019/0279440 A1\* 9/2019 Ricci .................. H04W 4/48
2020/0114889 A1\* 4/2020 Egnor .................. B60T 11/20

\* cited by examiner

ADVANCE DRIVER BRAKE CUSTOMIZING METHOD AND SYSTEM THEREOF

CROSS-REFERENCE TO RELATED APPLICATION

This application claims priority to Korean Patent Application No. 10-2019-0018389, filed on Feb. 18, 2019, which is incorporated herein by reference in its entirety.

BACKGROUND

Field of the Invention

The present disclosure relates to brake customizing of a driver, and more particularly, to a brake customizing system capable of allowing advance driver brake customizing to homogenize a different braking feeling according to a vehicle with a driver.

Description of Related Art

Generally, unlike an existing brake system, a brake-by-wire (BBW) system applied as a brake system of a vehicle may provide driver brake customizing. The driver brake customizing of the BBW system is based on a method in which a reaction simulator and a stroke sensor are installed at a brake pedal and a braking force is directly generated by a motor and a pump. Examples of the BBW system may include an electro mechanical brake for generating a braking force using an electronically controlled motor as a power source, and an electro wedge brake for boosting motor power using a wedge.

In particular, unlike manufacturing brake customizing, in the driver brake customization of the BBW system, a driver adjusts a braking feeling of a vehicle based on a driver's braking feeling. In particular, the maker brake customizing is a method in which a hydraulic pressure, which is generated for boosting a pedal operating force of a driver when a braking force of a brake is implemented, includes a pedal operation stroke, deceleration of the vehicle, and a pedal reaction force as vehicle braking feeling influence factors and thus, the driver is unable to intervene in the manufacturing brake customization.

Accordingly, the BBW system provides driver brake customization with a hydraulic pressure map capable of performing stroke-hydraulic pressure tuning with respect to a stroke-reaction force characteristic which is set using a spring and a damper. In particular, the hydraulic pressure map is able to perform the stroke-hydraulic pressure tuning through parameter setting using an appropriate interface within a range allowable by performance of system hardware.

Consequently, a vehicle manufacturer is capable of breaking from the existing brake system which directly connects the operation force of the driver to a braking device installed on a wheel through the BBW system, and the driver may receive a braking feeling of the vehicle customized to the driver through the BBW system. However, the driver brake customization does not take into account a situation of the driver.

First, when the same vehicle is driven by another person including family members in addition to the main driver, it is necessary to reset parameters of the hydraulic pressure map to change the braking feeling customized to the driver according to another person who feels inconvenient with respect to the braking feeling customized to the main driver. Second, when the driver changes the existing vehicle to a new vehicle, it is necessary to reset parameters of the hydraulic pressure map to change a braking feeling according to the manufacturer brake customization to a braking feeling customized to the driver. Third, when the same driver operates multiple vehicles at different points of time points, such as with vehicle sharing, a braking feeling customized to a previous vehicle driver gives a different feeling to a current driver. Therefore there is a need for a system capable of providing customization based on a driver as opposed to being based on a vehicle.

SUMMARY

An exemplary embodiment of the present disclosure is directed to an advance driver brake customizing method and a brake customizing system in which a set braking feeling customized to a driver's vehicle is identically applied to another vehicle. Therefore, even when a vehicle is changed, the same braking feeling may be provided to a driver, and particularly, matching or mapping between brake performance characteristic data per vehicle manufacturer and driver setting braking feeling data may be performed through a wireless network. Therefore, even when the same driver changes a vehicle or a driver for the same vehicle is changed, the same braking feeling may be maintained.

Other objects and advantages of the present invention may be understood by the following description and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present disclosure, an advance driver brake customizing method may include driver matching control of transplanting, by a driver controller in conjunction with a wireless network, driver braking feeling information of a driver's vehicle into another vehicle and directing a braking characteristic of the another vehicle to follow a braking characteristic of the driver's vehicle using the driver braking feeling information.

The driver's vehicle may be a braking feeling setting of which the braking characteristic is converted from a manufacturing default value to the driver braking feeling information, and the other vehicle may be a braking feeling setting of which the braking characteristic is maintained as the manufacturing default value. The driver braking feeling information may be a map parameter applied to a stroke-hydraulic pressure graph which outputs a braking hydraulic pressure according to a pedal stroke. Vehicle deceleration, a road surface friction coefficient, a braking force of a brake, a vehicle mass, a brake pressure, a caliper cylinder bore, the number of caliper cylinder pistons, an effective radius of a brake disc, and a tire radius may be applied to the map parameter.

The driver matching control may include an information transfer operation of transplanting the driver braking feeling information from the driver vehicle into the other vehicle as a map parameter via the wireless network, a map matching operation of synchronizing the map parameter with a hydraulic pressure map of the other vehicle, and a map following operation of directing the other vehicle to follow the driver braking feeling information.

The information transfer operation may include a map setting operation of confirming, by the driver's vehicle, the driver braking feeling information, an operation of transplanting the driver braking feeling information into a mobile device via the wireless network, and an operation of transplanting, by the mobile device, the driver braking feeling information into the other vehicle via the wireless network.

The advance driver brake customizing method may further include confirming, by a user interface of a driver controller installed within the driver's vehicle, the driver braking feeling information using a map parameter of a hydraulic pressure map, and confirming, by a user interface of a driver controller installed within the other vehicle, the transplantation of the driver braking feeling information using a map parameter of a hydraulic pressure map. The map matching operation may include an operation of determining, by the user interface of the driver controller installed within the other vehicle, whether the map parameter of the driver's vehicle is consistent with the map parameter of the hydraulic pressure map of the other vehicle. When the map parameter of the driver's vehicle is inconsistent with the map parameter of the hydraulic pressure map of the other vehicle, a map conversion operation may be performed of applying the map parameter of the driver's vehicle to the map parameter of the other vehicle.

The map conversion operation may include applying a conversion coefficient, and the conversion coefficient may be set to a difference in output value between a braking hydraulic pressure generated according to a stroke-hydraulic pressure graph of the driver's vehicle and a braking hydraulic pressure generated according to a stroke-hydraulic pressure graph of the other vehicle. The map following operation may be performed according to the output value of the stroke-hydraulic pressure graph applied to the hydraulic pressure map of the driver controller installed within the other vehicle.

In accordance with another exemplary embodiment of the present disclosure, a brake customizing system may include a driver controller configured to extract driver braking feeling information exchanged between two types of vehicles from a map parameter of a stroke-hydraulic pressure graph applied to a hydraulic pressure map and transmit and receive the map parameter, a mobile device configured to receive the transmitted map parameter and transmit the received map parameter, and a wireless network configured to connect the driver controller and the mobile device to perform the transmission and the reception.

The driver controller may be provided in each of the two types of the vehicles. The driver controller may include a user interface configured to retrieve and extract the map parameter and change a set value, a transceiver configured to perform the transmission and the reception, and a hydraulic pressure map having the stroke-hydraulic pressure graph.

The driver controller may provide vehicle deceleration, a road surface friction coefficient, a braking force of a brake, a vehicle mass, a brake pressure, a caliper cylinder bore, the number of caliper cylinder pistons, an effective radius of a brake disc, and a tire radius, which are detected from each of the two types of the vehicles, as the map parameter. The mobile device may include a smart phone or a personal digital assistant (PDA) terminal. The wireless network may include Bluetooth.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
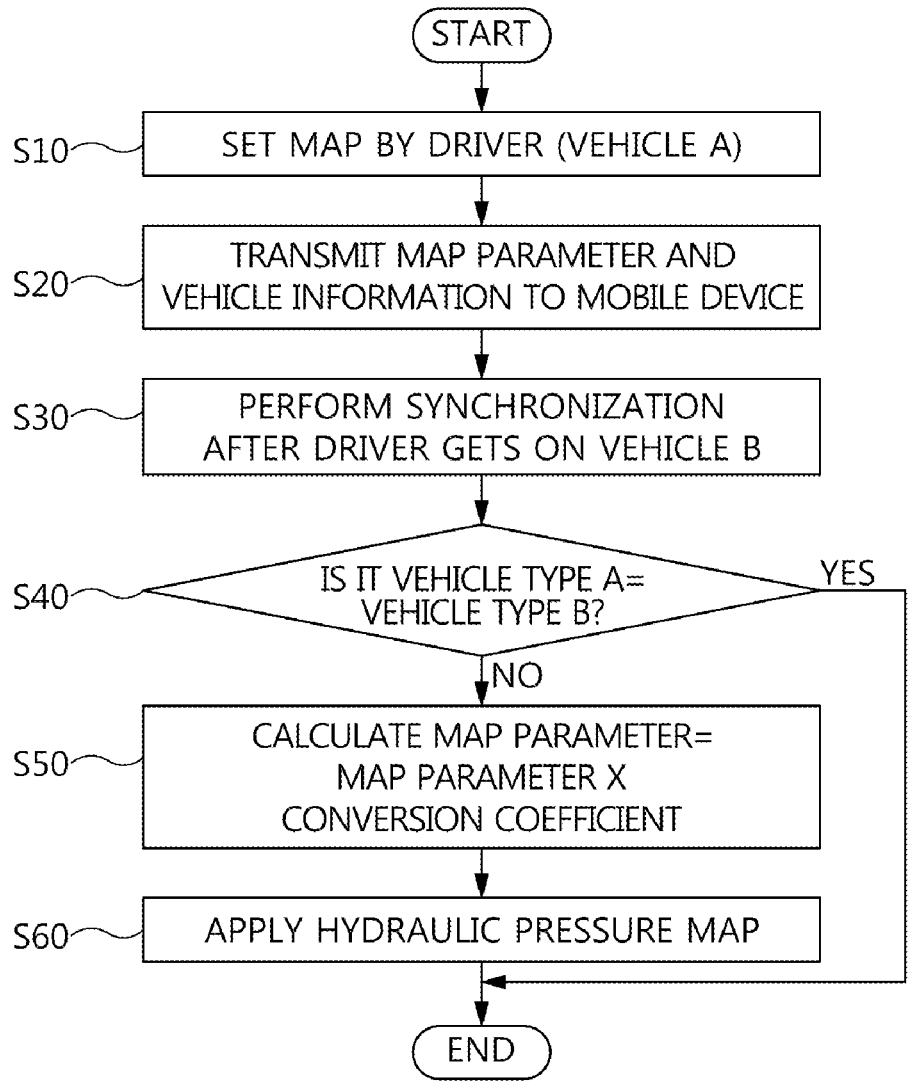
FIG. 1 is a flowchart of an advance driver brake customizing method according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described below in more detail with reference to the accompanying drawings, and these exemplary embodiments are examples of the present disclosure and may be embodied in various other different forms by those skilled in the art to which the present disclosure pertains so that the present disclosure is not limited to these exemplary embodiments.

Referring to FIG. 1, an advance driver brake customizing method may include driver matching control (S10, S20, S30, S40, S50, and S60) configured to convert driver braking feeling information transplanted (e.g., transferred or transmitted) from a driver's vehicle (e.g., a subject vehicle or a first vehicle) to another vehicle (e.g., a second vehicle) into data, and then identically reproduce a driver braking feeling by applying a hydraulic pressure map.

In particular, the driver matching control (S10 to S60) identically reproduces an optimally set vehicle braking feeling per driver (e.g., based on the particular driver) according to brake system performance characteristic data of the driver's vehicle by correcting a different value between different brake system performance data of vehicle types through map parameter matching regardless of different vehicle types of the same manufacturer or different manufacturers. Consequently, the advance driver brake customizing method may specialize the driver matching control (S10 to S60) to be implemented by only a vehicle manufacturer using system specifications of the vehicle manufacturer, thereby improving customer loyalty to the same brand vehicle and being applied to vehicle sharing.

Figure 2:
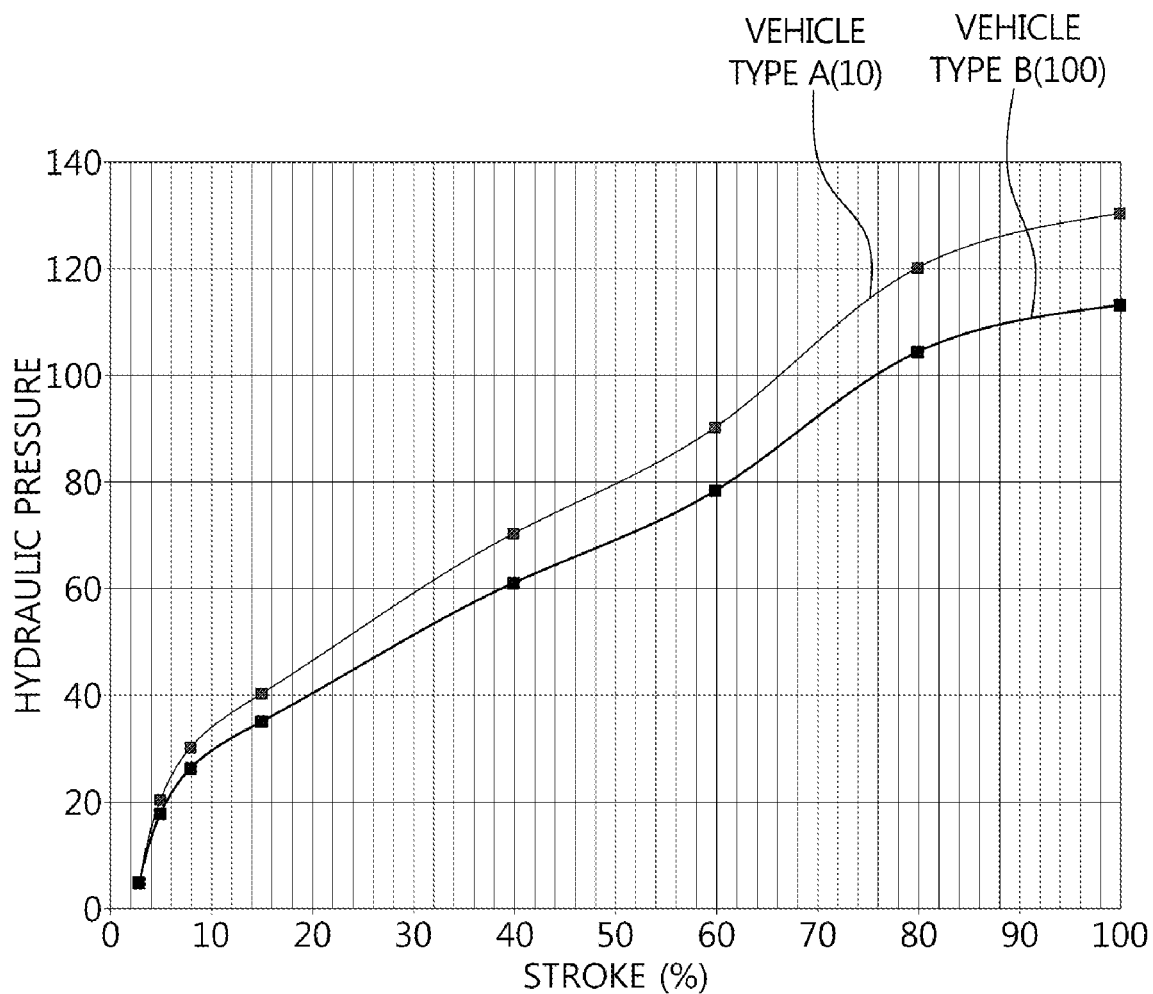
FIG. 2 is a diagram illustrating an example of a stroke-hydraulic pressure graph in which driver braking feelings between two vehicle types A and B are matched through map parameters applied to the advance driver brake customizing method according to an exemplary embodiment of the present disclosure.

Meanwhile, referring to FIG. 2, the result of a stroke-hydraulic pressure graph obtained from a map parameter applied to be able to adjust a braking hydraulic pressure of a brake in the driver matching control (S10 to S60) is illustrated. The map parameter maybe calculated as follows.

Calculation formula of vehicle deceleration:
$Decel = B/M = mu * [(p * \pi * D^2/4 * N) * Rd/Rt]/M$ Conversion formula of braking pressure between vehicle types: $p\_b = p\_a * (Mu\_a/Mu\_b) * (D\_a/D\_b)^2 * (N\_a/N\_b) * (Rd\_a/Rd\_b) * (Rt\_b/Rt\_a) * (M\_b/M\_a)$ wherein, "Decel" denotes vehicle deceleration, "mu" denotes a road surface friction coefficient, "B" denotes is a braking force of a brake, "M" denotes a vehicle mass, "p" denotes a brake pressure, "D" denotes a caliper cylinder bore, "N" denotes the number of the caliper cylinder pistons, "Rd" denotes an effective radius of a brake disc, "Rt" denotes a tire radius, and "n" denotes a circular constant. "*" denotes a multiplication sign.

In particular, the conversion formula of braking pressure between vehicle types shows that a braking pressure p_a at a specific stroke of a vehicle type A may be converted into a braking pressure p_b of a vehicle type B. Table 1 and Table 2 below show specifications of the vehicle types A and B applied to the calculation formula of vehicle deceleration and the conversion formula of braking pressure between vehicle types.

TABLE 1

| Vehicle type A | | | | | | | |
|---|---|---|---|---|---|---|---|
| Effective radius of a brake disc | Rd_a | | | 130 | | | |
| Friction coefficient | Mu_a | | | 0.32 | | | |
| Piston bore | D_a | | | 43 | | | |
| The number of pistons | N_a | | | 4 | | | |
| Radius of tire | Rt_a | | | 280 | | | |
| Vehicle mass | M_a | | | 1500 | | | |
| Stroke (%) | 3 | 5 | 8 | 15 | 40 | 60 | 80 | 100 |
| Input (bar) | 5 | 20 | 30 | 40 | 70 | 90 | 120 | 130 |

TABLE 2

| Vehicle type B | | | | | | | |
|---|---|---|---|---|---|---|---|
| Effective radius of a brake disc | Rd_b | | | 150 | | | |
| Friction coefficient | Mu_b | | | 0.4 | | | |
| Piston bore | D_b | | | 45 | | | |
| The number of pistons | N_b | | | 4 | | | |
| Radius of tire | Rt_b | | | 320 | | | |
| Vehicle mass | M_b | | | 1800 | | | |
| Input (bar) | 4.3 | 17.4 | 26.0 | 34.7 | 60.8 | 78.1 | 104.2 | 112.9 |

From Table 1 and Table 2, the stroke-hydraulic pressure graph shows that a braking hydraulic pressure with respect to a stroke of the vehicle type B is matched to have tendency coinciding with a braking hydraulic pressure with respect to a stroke of the vehicle type A, or the braking hydraulic pressure with respect to the stroke of the vehicle type A is matched to have tendency coinciding with the braking hydraulic pressure with respect to the stroke of the vehicle type B.

Therefore, in the advance driver brake customizing method, it is proved that, when the driver adjusts a braking feeling, a driver braking feeling set to a driver's vehicle type (e.g., the vehicle type A) may be implemented in another vehicle type (e.g., the vehicle type B) with an equal level of braking feeling using the driver matching control (S10 to S60).

Figure 3:
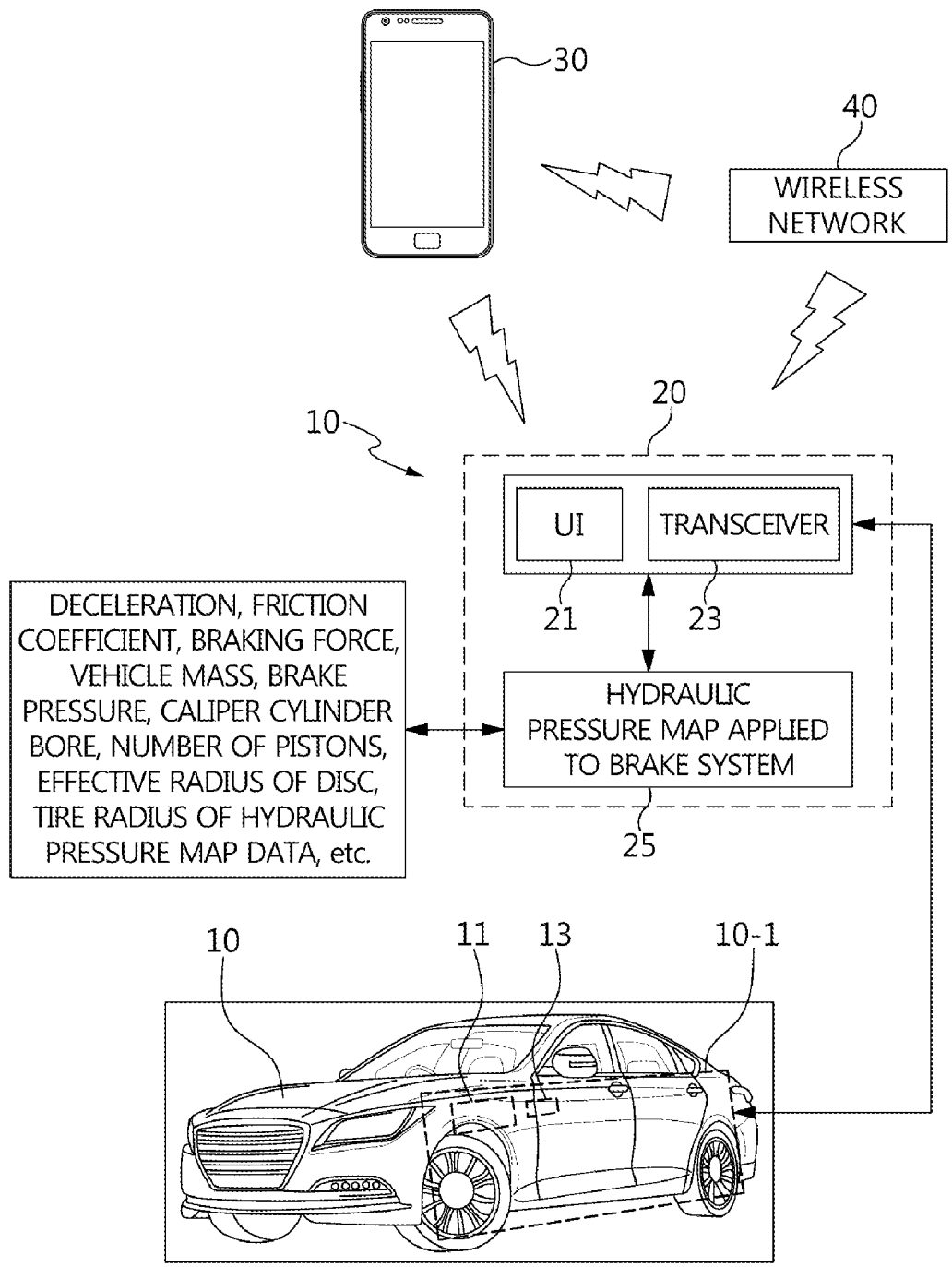
FIG. 3 is a block diagram illustrating a configuration example of a brake customizing system in which the advance driver brake customizing method according to an exemplary embodiment of the present disclosure is implemented.

Meanwhile, referring to FIG. 3, a brake customizing system 1 may include a braking feeling setting vehicle 10, a driver controller 20, a mobile device 30, and a wireless network 40. Specifically, the braking feeling setting vehicle 10 may include a brake system 10-1, and performance characteristic data of the brake system 10-1 implements a vehicle braking feeling optimally set for the driver. Therefore, the braking feeling setting vehicle 10 may be a driver's vehicle (e.g., a subject vehicle or first vehicle) in which the vehicle braking feeling is optimally set for the driver.

In particular, the brake system 10-1 may include a brake controller 11 and a stroke sensor 13 in addition to an essential braking device (not shown). For example, when the driver manipulates a brake pedal (not shown), the brake controller 11 may be configured to operate the essential braking system of the brake system 10-1 to perform braking of the braking feeling setting vehicle 10. The stroke sensor 13 may be installed at the brake pedal and may be configured to detect a pedal engagement amount of the brake pedal as a pedal stroke to determine a braking intent of the driver. Consequently, the brake controller 11 may be configured to adjust a brake pressure according to the pedal stroke of the stroke sensor 13 based on a stroke-pressure map. Further, the brake controller 11 may be configured to transmit a value of the pedal stroke to the driver controller 20.

Particularly, the driver controller 20 may be disposed within the braking feeling setting vehicle 10 and may be configured to communicate with the brake controller 11 and the mobile device 30 via the wireless network 40, thereby performing the driver matching control (S10 to S60). Therefore, the driver controller 20 may include a user interface (UI) 21, a transceiver 23, and a hydraulic pressure map 25.

For example, the UI 21 may be a braking feeling adjustment UI. The UI 21 may provide an appropriate window and a pop-up window for adjusting the performance characteristic data of the brake system 10-1 to a braking feeling customized to the driver. In particular, the UI 21 may provide a function in which hydraulic pressure map data of a basic map originally provided in the hydraulic pressure map 25 may be corrected by the driver within an allowable range. The hydraulic pressure map data may include vehicle deceleration, a tire friction coefficient, a vehicle mass, a brake pressure, a caliper cylinder bore, the number of engine pistons, an effective radius of a brake disc, a tire radius, and the like.

For example, the transceiver 23 may be connected to the wireless network 40 to transmit map parameters of the hydraulic pressure map 25 set to the UI 21 to the brake controller 11 and the mobile device 30 while storing the map parameters thereof. In particular, the transceiver 23 may be a portable wireless communication device or a smart key of the driver configured to transmit and store the map parameters of the hydraulic pressure map 25. For example, the hydraulic pressure map 25 may include a stroke-hydraulic pressure graph in which the pedal stroke and the braking hydraulic pressure are applied as default values based on a brake characteristic of the vehicle manufacturer to form an engagement amount of the brake pedal as a braking pressure for braking or decelerating the vehicle.

However, the hydraulic pressure map 25 may apply the map parameters, which are generated in the UI 21 by reflecting the vehicle deceleration Decel, the road surface friction coefficient mu, the braking force of a brake B, the vehicle mass M, the brake pressure p, the caliper cylinder bore D, the number of caliper cylinder pistons N, the effective radius of a brake disc Rd, and the tire radius Rt as the hydraulic pressure map data, to a variation of an output value of the stroke-hydraulic pressure graph. Therefore, the hydraulic pressure map 25 may digitize and store driver customized change data by an appropriate stroke control point using the map parameters and apply the digitized driver customized change data to the stroke-hydraulic pressure graph, thereby generating an output value set by the user.

As described above, the driver controller 20 may be configured to change the output value of the stroke-hydraulic pressure graph using the driver customized change data as the map parameters of the hydraulic pressure map 25. Consequently, the driver controller 20 may be configured to operate the brake system 10-1 of the braking feeling setting vehicle 10 (e.g., the subject vehicle) to generate a hydraulic pressure based on the changed map and allow a set braking feeling desired by the driver based on an intrinsic characteristic of the brake system 10-1 (i.e., braking deceleration vs. a stroke) to be implemented.

In particular, the driver controller 20 may be configured to transmit and receive information regarding the map parameters via the transceiver 23. The mobile device 30 may be a smart phone or a personal digital assistant (PDA) terminal. When the driver enters another vehicle, that is, a second vehicle (i.e., from the braking feeling setting vehicle 10 to a braking feeling matching vehicle 100 (see FIG. 4)) and then the map parameters stored in the driver controller 20 are transmitted, the wireless network 40 may be configured to perform the transmission and synchronization between the braking feeling setting vehicle 10 and the braking feeling matching vehicle 100. In particular, the wireless network 40 may be a short range wireless network such as Bluetooth.

Hereinafter, the advance driver brake customizing method of FIG. 1 will be described in detail with reference to FIGS. 3 and 4. In particular, a control main body may be the driver controller 20, and a control target may be the brake system 10-1 operated by tuning of the hydraulic pressure map 25 provided in each of the driver's vehicle (e.g., subject or first vehicle) and the other vehicle (e.g., second vehicle). Therefore, the driver's vehicle and the other vehicle have the same driver controller 20.

Specifically, the driver controller 20 for the driver matching control (S10 to S60) may be configured to execute an information transfer operation of transferring driver braking feeling information from the driver's vehicle to the other vehicle as map parameters via the wireless network 40 (S10 to S30), a map matching operation of synchronizing the map parameters with a hydraulic pressure map of the other vehicle (S40 and S50), and an operation of directing the other vehicle to follow the driver braking feeling information (S60).

Hereinafter, the driver's vehicle may be referred to as the braking feeling setting vehicle 10 or a vehicle A, and the other vehicle may be referred to as the braking feeling matching vehicle 100 or a vehicle B. First, operation S10 is a driver map setting operation and may be performed in the vehicle A (e.g., the braking feeling setting vehicle 10).

Figure 4:
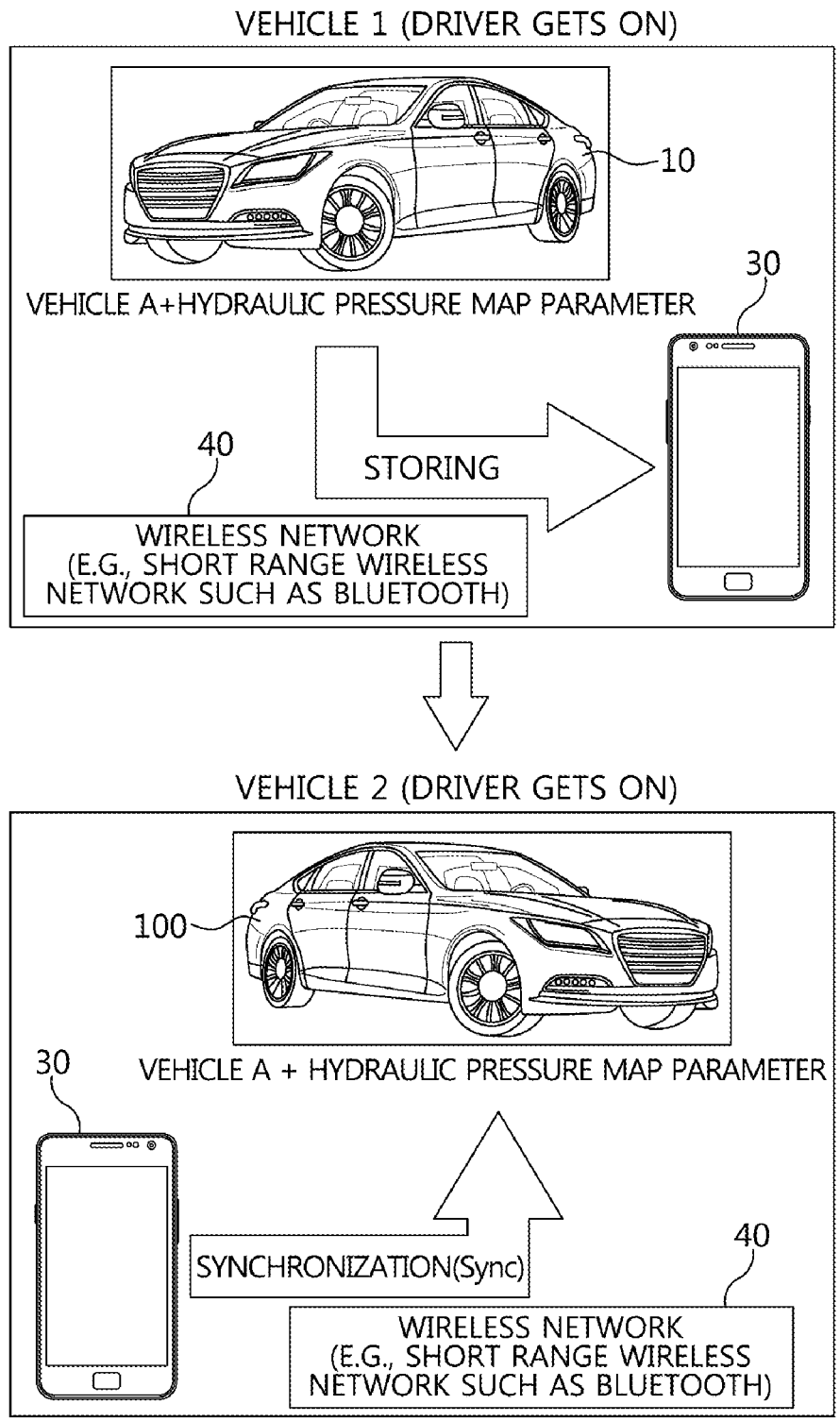
FIG. 4 is a diagram illustrating an example in which braking feeling customizing between two vehicles is implemented through the brake customizing system according to an exemplary embodiment of the present disclosure.

Referring to FIGS. 3 and 4, the driver controller 20 may be configured to retrieve and verify the driver braking feeling information through the UI 21 in conjunction with the hydraulic pressure map 25 to perform the driver map setting (S10), thereby confirming the map parameters of the hydraulic pressure map 25, which are preset and stored in the vehicle A (e.g., the braking feeling setting vehicle 10). Particularly, the map parameters may be set by the vehicle manufacturer or may be generated in the UI 21 by the driver by reflecting the vehicle deceleration, the tire friction coefficient, the vehicle mass, the brake pressure, the caliper cylinder bore, the number of engine pistons, the effective radius of a brake disc, the tire radius as the hydraulic pressure map data. Then, the driver controller 20 may be configured to perform the driver braking feeling information transfer operation (S20).

Further, referring to FIGS. 3 and 4, the driver controller 20 may be configured to perform the driver braking feeling information transfer operation (S20) by storing the map parameters confirmed in the UI 21 in the transceiver 23 and then transmitting the stored map parameters to the mobile device 30 of the driver by being interlocked with the wireless network 40. In particular, the transmitted information may include information regarding the map parameters, a vehicle type, and a portable device.

Consequently, the mobile device 30 of the driver may temporarily store the driver braking feeling information with the received map parameters. Thereafter, the driver controller 20 may be configured to perform the vehicle synchronization operation with the vehicle B after the driver enters the vehicle B (S30), and the map parameter synchronization operation (S40).

Referring to FIGS. 3 and 4, a transceiver 23 provided within a driver controller 20 of the vehicle B (e.g., the braking feeling matching vehicle 100) may be interlocked with the mobile device 30 configured to store the driver braking feeling information of the vehicle A (e.g., the braking feeling setting vehicle 10) to download the received map parameters on a UI 21, thereby downloading and transplanting the information of the vehicle A (the braking feeling setting vehicle 10) into the vehicle B (S30).

Consequently, the map parameter synchronization (S40) may be performed such that the driver braking feeling information of the vehicle A (i.e., the braking feeling setting vehicle 10) corresponds with that of the vehicle B (i.e., the braking feeling matching vehicle 100). In particular, when the map parameter synchronization (S40) is performed at the present time between the vehicle A (e.g., the braking feeling setting vehicle 10) and the vehicle B (e.g., the braking feeling matching vehicle 100), a driver controller 20 of the vehicle B (e.g., the braking feeling matching vehicle 100) may be configured to perform the hydraulic pressure map application operation (S60). When the map parameter synchronization (S40) is not performed at the present time, the driver controller 20 of the vehicle B (e.g., the braking feeling matching vehicle 100) may be configured to perform the map parameter matching operation (S50).

Subsequently, the driver controller 20 of the vehicle B (e.g., the braking feeling matching vehicle 100) may be configured to perform the map parameter matching operation (S50). Referring to FIGS. 3 and 4, the driver controller 20 of the vehicle B (e.g., the braking feeling matching vehicle 100) may be configured to compare the driver braking feeling information with set data of the map parameters included in the hydraulic pressure map 25 while confirming the driver braking feeling information of the vehicle A (e.g., the braking feeling matching vehicle 10) with the UI 21 of the driver controller 20 installed within the vehicle B. Consequently, the driver controller 20 may be configured to complete the map parameter matching operation (S50) of matching the driver braking feeling information.

In particular, the map parameter matching operation (S50) may use the following map parameter matching formula.

Map parameter matching formula: $A = a \times K$ wherein, "A" denotes a map parameter defined as a matching parameter converted into a new value in the hydraulic pressure map 25 of the braking feeling matching vehicle 100, "a" denotes a map parameter defined as an inherent map parameter included in hydraulic pressure map 25 of the vehicle B, and "K" denotes a conversion coefficient. "×" denotes a multiplication sign.

In particular, the "K" is a difference value of a braking hydraulic pressure generated between the map parameters of the vehicle A and the map parameters of the vehicle B and thus may be calculated from or applied to the UI 21. The difference value of the braking hydraulic pressure may be defined as a difference in output value between the braking hydraulic pressures of the vehicle type A and the vehicle type B in the stroke-hydraulic pressure graph of FIG. 2.

Therefore, in the vehicle B, the existing set data included in the hydraulic pressure map 25 may be converted into a map parameter A defined by the matching map parameter through the UI 21 of the driver controller 20. Consequently, the stroke-hydraulic pressure graph included in the hydraulic pressure map 25 of the vehicle B may correspond with the stroke-hydraulic pressure graph based on the driver braking feeling data of the vehicle A. This stroke-hydraulic pressure graphs and coincidence tendency are illustrated in FIG. 2.

Finally, the driver controller 20 may be configured to perform the hydraulic pressure map application operation (S60). Referring to FIG. 3, when the brake system 10-1 is operated based on the manipulation of the brake pedal, the driver controller 20 of the vehicle B may be configured to apply the hydraulic pressure map 25 to generate an output value of the stroke-hydraulic pressure graph based on a pedal stroke detected by the stroke sensor 13, thereby performing the hydraulic pressure map application operation (S60). Consequently, the driver braking feeling of the vehicle B may be implemented to be identical to an equal level of the driver braking feeling of the vehicle A.

As described above, the advance driver brake customizing method applied to the brake customizing system 1 according to the present exemplary embodiment may identically implement the braking feeling set according to the driver's vehicle regardless of a vehicle type by transplanting the driver braking feeling information of the braking feeling setting vehicle 10 into the braking feeling matching vehicle 100 and directing the braking characteristic of a brake of the brake system 10-1, which is applied to the braking feeling matching vehicle 100, to follow the braking characteristic of a brake of the brake system 10-1, which is applied to the braking feeling matching vehicle 10, through the driver matching control (S10 to S60) of the driver controller 20 in conjunction with the wireless network 40. In particular, even when the same driver changes a vehicle or a driver for the same vehicle is changed, the same braking feeling may be maintained.

In accordance with a brake customizing system according to the present disclosure may implement the following actions and effects by applying an advance driver brake customizing to a braking feeling.

First, a braking feeling customized to a driver may be applied identically regardless of a vehicle type. Second, when the same vehicle is driven by others including family members in addition to the driver, the existing braking feeling may be adjusted to the changed driver. Third, when the driver changes a vehicle, the braking feeling customized to the driver may be identically maintained. Fourth, mapping and transplantation of braking feeling data customized to a driver's vehicle may be performed via a wireless network such that a customizing task may be performed without a spatial limitation. Fifth, brake system specifications of a vehicle maker may be used for customizing between vehicles such that convenience of the customizing task may be provided. Sixth, since the customization may be specified to a vehicle type of the vehicle maker, brand loyalty may be increased in a situation such as vehicle sharing.

Although the foregoing description has been described with a focus on novel features of the present disclosure as being applied to various exemplary embodiments, those skilled in the art will be appreciated that various deletions, substitutions, and alterations can be made from the forms and details of the above-described apparatus and method without departing from the scope of the present disclosure. Accordingly, the scope of the present disclosure is defined by the appended claims rather than the foregoing description. All variations equivalent to the scope of the appended claims will fall within the scope of the present disclosure.

While the present disclosure has been described with respect to the exemplary embodiments, it will be apparent to those skilled in the art that various changes and modifications may be made without departing from the spirit and scope of the invention as defined in the following claims. Accordingly, it should be noted that such alternations or modifications fall within the claims of the present disclosure, and the scope of the present disclosure should be construed on the basis of the appended claims.

What is claimed is:

1. An advance driver brake customizing method, comprising:

an information transfer operation of transplanting, by a driver controller in conjunction with a mobile device and a wireless network, a driver braking feeling information from a driver vehicle into another vehicle as a map parameter through the wireless network, a map matching operation of synchronizing the map parameter with a hydraulic pressure map of the another vehicle by the user interface of the driver controller installed in the another vehicle, and determining whether the map parameter of the driver's vehicle is consistent with the map parameter of the hydraulic pressure map of the another vehicle;

a map conversion operation of applying the map parameter of the driver's vehicle to the map parameter of the another vehicle when the map parameter of the driver's vehicle is not consistent with the map parameter of the hydraulic pressure map of the another vehicle; and a map following operation of directing, by the driver controller, a braking characteristic of the second vehicle to follow a braking characteristic of the subject vehicle using the driver braking feeling information;

wherein the map conversion operation uses a map parameter matching formula, $A=a \times K$, where A defines a new value in the hydraulic pressure map, a is an inherent map parameter in the hydraulic pressure map, and K defines a conversion coefficient.

2. The advance driver brake customizing method of claim 1, wherein the subject vehicle is a braking feeling setting vehicle of which the braking characteristic is converted from a manufacturer default value to the driver braking feeling information, and the second vehicle is a braking feeling setting vehicle of which the braking characteristic is maintained as the manufacturer default value.

3. The advance driver brake customizing method of claim 1, wherein the driver braking feeling information is the map parameter applied to a stroke-hydraulic pressure graph which outputs a braking hydraulic pressure based on a pedal stroke.

4. The advance driver brake customizing method of claim 3, wherein vehicle deceleration, a road surface friction coefficient, a braking force of a brake, a vehicle mass, a brake pressure, a caliper cylinder bore, the number of caliper cylinder pistons, an effective radius of a brake disc, and a tire radius are applied to the map parameter.

5. The advance driver brake customizing method of claim 1, wherein the wireless network includes Bluetooth.

6. The advance driver brake customizing method of claim 1, wherein the information transfer operation includes:

confirming, by the subject vehicle, the driver braking feeling information;

transplanting the driver braking feeling information into a mobile device via the wireless network; and transplanting, by the mobile device, the driver braking feeling information into the second vehicle via the wireless network.

7. The advance driver brake customizing method of claim 6, further comprising:

confirming, by a user interface of a driver controller installed within the subject vehicle, the driver braking feeling information using a map parameter of a hydraulic pressure map; and conforming, by a user interface of a driver controller installed in the second vehicle, the transplantation of the driver braking feeling information using a map parameter of a hydraulic pressure map.

8. The advance driver brake customizing method of claim 6, wherein the mobile device includes a smart phone or a personal digital assistant (PDA) terminal.

9. The advance driver brake customizing method of claim 1, wherein the conversion coefficient is set to a difference in output value between a braking hydraulic pressure generated based on a stroke-hydraulic pressure graph of the subject vehicle and a braking hydraulic pressure generated based on a stroke-hydraulic pressure graph of the second vehicle.

10. The advance driver brake customizing method of claim 1, wherein the map following operation is performed based on the output value of the stroke-hydraulic pressure graph applied to the hydraulic pressure map of the driver controller installed in the second vehicle.

11. A brake customizing system, comprising:

a driver controller configured to extract driver braking feeling information exchanged between two types of vehicles from a map parameter of a stroke-hydraulic pressure graph applied to a hydraulic pressure map and configured to transmit and receive the map parameter;

a mobile device configured to receive the transmitted map parameter and transmit the received map parameter; and a wireless network configured to connect the driver controller and the mobile device to perform the transmission and the reception;

wherein the driver controller, the mobile device, and the wireless network are configured to execute the method of claim 1.

12. The brake customizing system of claim 11, wherein a driver controller is provided in each of the two types of the vehicles.

13. The brake customizing system of claim 11, wherein the driver controller includes:

a user interface configured to retrieve and extract the map parameter and change a set value;

a transceiver configured to perform the transmission and the reception; and a hydraulic pressure map having the stroke-hydraulic pressure graph.

14. The brake customizing system of claim 13, wherein the driver controller is configured to provide vehicle deceleration, a road surface friction coefficient, a braking force of a brake, a vehicle mass, a brake pressure, a caliper cylinder bore, the number of caliper cylinder pistons, an effective radius of a brake disc, and a tire radius, which are detected from each of the two types of the vehicles, as the map parameter.

15. The brake customizing system of claim 11, wherein the mobile device includes a smart phone or a personal digital assistant (PDA) terminal.

16. The brake customizing system of claim 11, wherein the wireless network includes Bluetooth.

* * * * *